Dec. 8, 1936.   J. W. McDONNELL   2,063,452
TIRE PRESSURE INDICATING SYSTEM
Filed Jan. 10, 1934
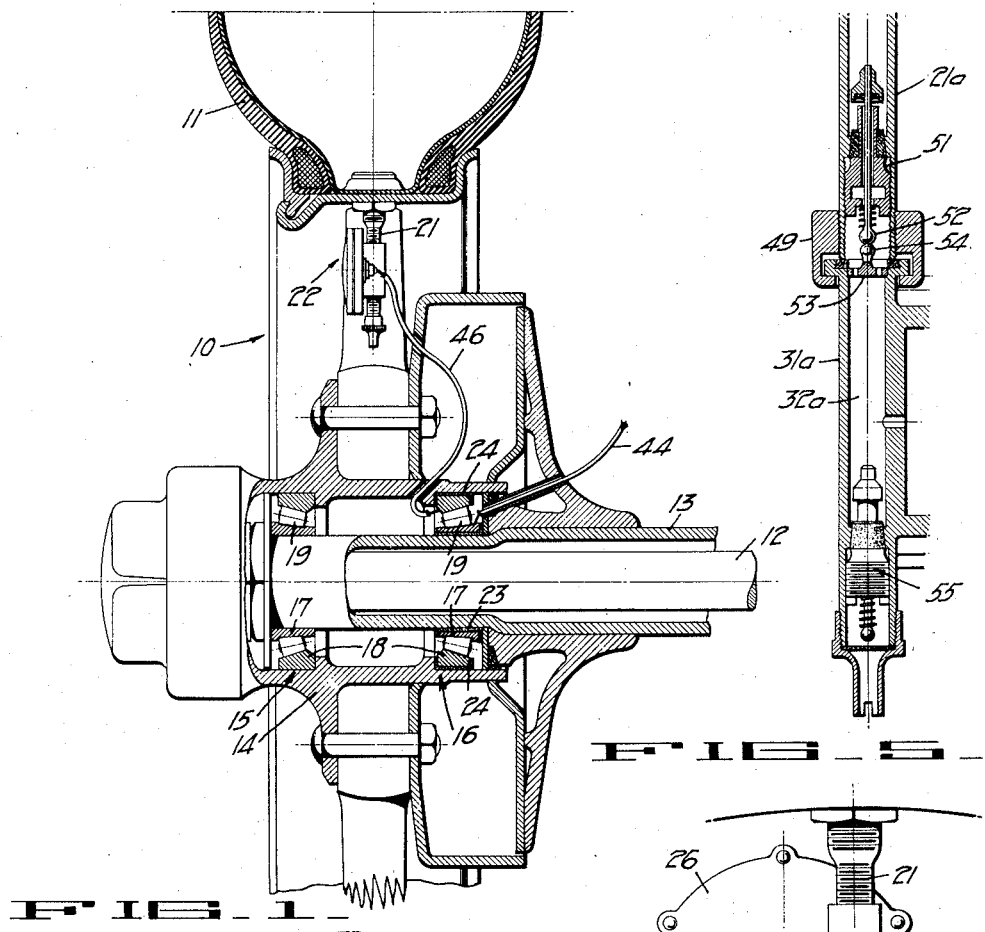
FIG_1_
FIG_5_
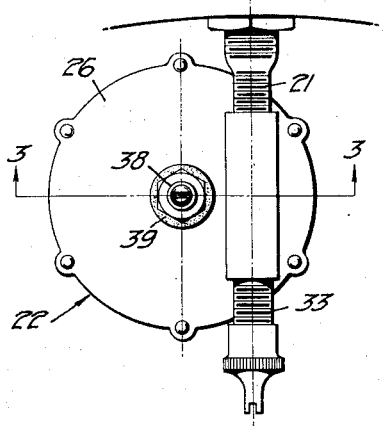
FIG_2_
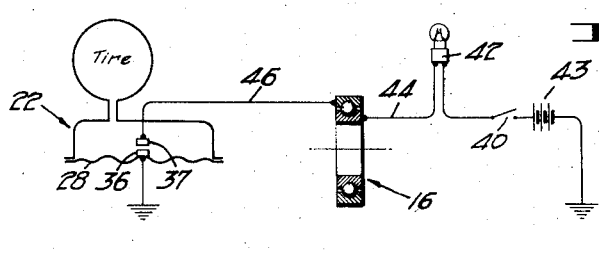
FIG_3_
FIG_4_
INVENTOR
James W. McDonnell
BY
White, Prost, Fleher Lothrop
ATTORNEY Patented Dec. 8, 1936

2,063,452

UNITED STATES PATENT OFFICE 2,063,452

TIRE PRESSURE INDICATING SYSTEM

James W. McDonnell, Palo Alto, Calif.

Application January 10, 1934, Serial No. 706,012

5 Claims. (Cl. 177—311)

The invention relates generally to electrical systems for use on automotive vehicles, for the purpose of indicating the degree of inflation of the tires, while the vehicle is in operation.

It is an object of the invention to provide a system of the above character which will obviate the use of conventional commutating means upon the wheels of the vehicle, as has been proposed in the past, to complete the electrical circuit or circuits. In place of such conventional commutating means, the present invention is characterized by the use of the main load bearings for the wheels, in a manner to be hereinafter explained.

It is a further object of the invention to provide a device to be attached to an automobile tire for controlling an electrical circuit in accordance with tire pressure, which will not be affected by the speed of rotation of the wheel.

Further objects of the invention will appear from the following description in which the preferred embodiment of the invention has been set forth in detail in conjunction with the accompanying drawing.

Referring to the drawing:

Figure 1 is a side elevational view, illustrating my invention applied to a conventional type of automobile wheel.

Figure 2 is an enlarged side elevational view of the pressure-responsive, circuit controlling device illustrated in Figure 1.

Figure 3 is a cross-sectional detail taken along the line 3—3 of Figure 2.

Figure 4 is a circuit diagram illustrating the electrical connections between the different parts of my system.

Referring first to Figure 1, I have shown a conventional type of automotive wheel 10 to which the pneumatic tire 11 is applied. In this instance, a rear wheel of an automobile is illustrated, which is driven by the floating shaft 12, within the stationary tubular shaft 13. The metal hub 14 of the wheel is journaled to the end of the tubular shaft 13 by means of two roller bearing assemblies 15 and 16. Each of these bearing assemblies includes inner and outer annular races 17 and 18, together with ball bearings or rollers 19. Connected to the inflating stem 21 of the tire there is a pressure-responsive circuit controlling device 22, to be presently explained in detail.

In order to utilize at least one of the bearing assemblies for the purpose of completing an electrical circuit between device 22 and an indicating or signalling device carried upon the instrument panel of the vehicle, insulation 23 is interposed between the inner annular race 17 for the assembly 16, and the stationary tubular shaft 13. Likewise, insulation 24 is interposed between the outer annular race 18 and the metal hub 14. This insulation should be of relatively strong material, such as micarta, in order to amply carry the load placed upon the bearing assembly 16.

A desirable form of circuit controlling device 22 is illustrated in detail in Figures 2 and 3. This device consists of a relatively flat body 26, provided with a cover 27. Extending across the interior of this body there is a flexible diaphragm 28, serving to form an interior pressure chamber 29. The body 26 is also provided with an enlargement 31 formed with a longitudinal passage 32. Passage 32 has one end threaded for attachment to the valve stem 21, and the other end internally threaded for attachment with an inflating tube 33. A duct 34 serves to establish communication between passage 32 and the pressure chamber 29.

In order to control an electrical circuit in accordance with flexing of the diaphragm 28, a pair of electrical contacts 36 and 37 are provided. Contact 36 is shown mounted upon diaphragm 28, while contact 37 is mounted upon the adjustable stationary stud 38. Insulation 39 is afforded between the stud 38 and the metal body 26.

It is evident from the above that as long as the pressure within the tire is above a given minimum value, contacts 36 and 37 will be retained in open position. However, when the pressure of the tire falls below a safe value, these contacts will close. In this connection it should be noted that the space 41 between cover 27 and diaphragm 28 is vented to the atmosphere.

Figure 4 shows diagrammatically the manner in which circuit connections are made to the apparatus described above. A suitable indicator to be located upon the instrument board of the automobile, such as an electric light 42, is connected in series with a battery 43. One conductor 44 from the lamp 42 is connected to the inner race for the bearing assembly 16, while the outer race of this assembly is connected by conductor 46 to the contact 37 of device 22. The circuit is completed by grounding one side of the battery 43 to the metallic frame of the automobile, and by likewise grounding the movable contact 36. It will be evident that when the pressure of the tire falls below a safe value, contacts 36 and 37 are closed and the circuit is completed through the bearing assembly 16 to the lamp 42, causing burning of the lamp to warn the operator.

Certain distinctive features of my invention will be apparent from the above description. The use of one of the main load bearing assemblies for the wheel eliminates the use of additional commutating means or slip rings, thus obviating special parts which are not adapted for conventional wheel designs and which are apt to result in erratic operation. In this connection I have found that even though a roller or ball bearing is bathed in lubricant, it will conduct a current flow between the rollers or balls, without interruption. A further feature of the invention, concerning the construction of the pressure-responsive circuit controlling device 22 is that this device is so constructed and mounted upon stem 21, that diaphragm 28 is parallel to the plane of rotation of the wheel. Therefore, varying centrifugal forces, by virtue of different speeds of rotation of the wheel, will have no effect upon operation of the contacts 36 and 37.

In Fig. 5 there is shown a modification of the device of Fig. 2, to facilitate removal and attachment of this device to the stem of a pneumatic tire. In this case enlargement 31a has an internally threaded nut 49 secured to its one end, which serves to engage the tire stem 21a. The tire stem 21a is provided with a conventional valve 51, which may be opened by depressing pin 52. Extending across the one end of passage 32a, there is also a bridge 53, which is parted, and which carries a projection 54 to engage and normally depress pin 52. At the other end of passage 32a there is also a conventional check valve 55 thru which the tire may be inflated. With such an arrangement it is evident that as device 22 is applied to a tire stem, the stem valve is automatically opened to place device 22 in communication with the tire. Likewise device 22 can be removed at any time without loss of air from the tire.

I claim:

1. In a tire pressure indicating system for an automotive vehicle having pneumatic tired wheels, pressure-responsive circuit control means connected to a tire and adapted to rotate together with the wheel associated with the same, an electrical indicator carried by the main frame of the vehicle, and a load bearing for the wheel, said bearing being insulated from the main frame of the vehicle and serving to complete said electrical circuit.

2. In a tire pressure indicating system for an automotive vehicle having pneumatic tired wheels, pressure-responsive circuit control means connected to a tire and adapted to rotate together with the wheel associated with the same, an electrical indicator carried by the main frame of the vehicle, a load-carrying bearing assembly for the wheel insulated from the main frame of the vehicle, and an electrical circuit connecting said circuit control means with said indicator and being completed through said bearing assembly.

3. In a tire pressure indicating system for an automotive vehicle having pneumatic tired wheels, pressure-responsive circuit control means connected to a tire and adapted to rotate with the wheel associated with said tire, an electrical indicator carried by the main frame of the vehicle, a pair of load-carrying bearing assemblies forming the load main bearing for the wheel, one of said bearing assemblies being insulated with respect to the main frame of the vehicle, and an electrical circuit serving to connect said circuit control means with said indicator, said circuit being completed through said insulated bearing assembly.

4. In a tire pressure indicating system for automotive vehicles having pneumatic tired wheels, where the system includes pressure-responsive circuit control means connected to the tire stem together with an electrical indicator carried by the vehicle frame and an electrical circuit connecting the control means with the indicator; a load-carrying bearing assembly for the wheel, and means for electrically insulating the assembly with respect to the vehicle frame, said assembly being adapted to form one conductor for said circuit.

5. In a tire pressure indicating system for automotive vehicles having pneumatic tired wheels, where the system includes pressure-responsive circuit control means connected to the tire stem together with an electrical indicator carried by the vehicle frame and an electrical circuit connecting the control means with the indicator; a load-carrying bearing assembly for the wheel, said assembly including inner and outer annular races, and means for electrically insulating the outer race with respect to the wheel and the inner race with respect to the frame of the vehicle, said assembly being adapted to form one conductor for said circuit.

JAMES W. McDONNELL.